(12) United States Patent
Trontelj

(10) Patent No.: US 6,208,235 B1
(45) Date of Patent: *Mar. 27, 2001

(54) APPARATUS FOR MAGNETICALLY DECOUPLING AN RFID TAG

(75) Inventor: Janez Trontelj, Tržaška (SI)

(73) Assignee: Checkpoint Systems, Inc., Thorofare, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,027

(22) Filed: Mar. 5, 1998

Related U.S. Application Data

(60) Provisional application No. 60/041,466, filed on Mar. 24, 1997.

(51) Int. Cl.$^7$ ........................................ H04Q 5/22
(52) U.S. Cl. ............... 340/10.1; 340/572.3; 340/572.5; 340/572.7; 340/10.2; 340/10.3; 607/60
(58) Field of Search ............... 340/572.3, 572.5, 340/572.7, 563, 528, 10.1, 10.2, 10.3, 825.54, 10.33–10.34; 343/788, 742, 867, 876; 607/60

(56) References Cited

U.S. PATENT DOCUMENTS

| | | |
|---|---|---|
| 4,019,181 | 4/1977 | Olsson et al. . |
| 4,196,418 | 4/1980 | Kip et al. . |
| 4,481,428 | 11/1984 | Charlot, Jr. . |
| 4,583,099 | 4/1986 | Reilly et al. . |
| 4,598,276 | 7/1986 | Tait . |
| 4,600,829 | 7/1986 | Walton . |
| 4,734,680 | 3/1988 | Gehman et al. . |
| 4,799,059 | 1/1989 | Grindahl et al. . |
| 4,951,057 | 8/1990 | Nagel . |
| 5,061,941 | * 10/1991 | Lizzi et al. ..................... 343/742 |
| 5,065,138 | 11/1991 | Lian et al. . |
| 5,072,222 | 12/1991 | Fockens . |
| 5,084,699 | 1/1992 | DeMichele . |
| 5,103,222 | 4/1992 | Hogen Esch et al. . |
| 5,142,292 | * 8/1992 | Chang ..................... 343/742 |
| 5,153,583 | * 10/1992 | Murdoch ..................... 340/10.34 |
| 5,182,543 | 1/1993 | Siegel et al. . |
| 5,189,397 | 2/1993 | Watkins et al. . |
| 5,241,298 | 8/1993 | Lian et al. . |
| 5,287,113 | 2/1994 | Meier . |
| 5,302,901 | 4/1994 | Snelten . |
| 5,373,303 | 12/1994 | D'Hont . |
| 5,383,134 | 1/1995 | Wrzesinski . |
| 5,430,441 | 7/1995 | Bickley et al. . |
| 5,448,230 | 9/1995 | Schanker et al. . |
| 5,517,179 | 5/1996 | Charlot, Jr. . |
| 5,530,437 | 6/1996 | Goldberg . |
| 5,530,702 | 6/1996 | Palmer et al. . |
| 5,539,394 | 7/1996 | Cato et al. . |
| 5,550,547 | 8/1996 | Chan et al. . |
| 5,591,951 | 1/1997 | Doty . |

(List continued on next page.)

OTHER PUBLICATIONS

Kevin Sharp, Physical Reality: A Second Look, idSystems, pp. 1–6, Mar. 2000.*
Kevin Sharp, The Near and Far of It, idSystems, p. 1, Mar. 2000.*

*Primary Examiner*—Michael Horabik
*Assistant Examiner*—William Bangachon
(74) *Attorney, Agent, or Firm*—Akin, Gump, Strauss, Hauer & Feld, L.L.P.

(57) ABSTRACT

A resonant circuit tag includes an integrated circuit for storing data and an antenna circuit for generating a first local field and resonating at a first predetermined radio frequency. A second circuit including an inductive coil selectively generates a second local field such that a sum of the first and second local fields approaches zero. The second circuit thus allows the resonant tag to be selectively decoupled from its environment.

20 Claims, 1 Drawing Sheet

U.S. PATENT DOCUMENTS

| | | |
|---|---|---|
| 5,596,273 | 1/1997 | Yabe et al. . |
| 5,600,243 | 2/1997 | Colclough . |
| 5,608,417 | 3/1997 | de Vall . |
| 5,610,384 | 3/1997 | Goto . |
| 5,621,323 | 4/1997 | Larsen . |
| 5,627,544 | 5/1997 | Snodgrass et al. . |
| 5,680,106 | 10/1997 | Schrott et al. . |
| 5,701,121 * | 12/1997 | Murdoch .......................... 340/10.34 |
| 5,914,692 * | 6/1999 | Bowers et al. ....................... 343/742 |
| 5,923,300 * | 7/1999 | Mejia ................................. 343/788 |

* cited by examiner

APPARATUS FOR MAGNETICALLY DECOUPLING AN RFID TAG

CROSS-REFERENCE TO RELATED APPLICATION

This application claims the benefit of U.S. Provisional Patent Application Ser. No. 60/041,466, filed Mar. 24, 1997.

BACKGROUND OF THE INVENTION

Tagging of articles for identification and/or theft protection is known. For instance, many articles are identified using a bar code comprising coded information which is read by passing the bar code within view of a scanner. Many articles also include a resonant tag for use in theft detection and prevention. More recently, passive resonant tags which return unique or semi-unique identification codes have been developed. These tags typically include an integrated circuit (IC) which stores the identification code. Such "intelligent" tags provide information about an article or person with which the tag is associated which is detected in the zone of an interrogator or reader. The tags are desirable because they can be interrogated rapidly, and from a distance. U.S. Pat. No. 5,446,447 (Carney et al.), U.S. Pat. No. 5,430,441 (Bickley et al.), and U.S. Pat. No. 5,347,263 (Carroll et al.) disclose three examples of such intelligent tags.

Radio frequency identification (RFID) tags or cards generally include a resonant antenna circuit electrically connected to the IC. The IC is essentially a programmable memory for storing digitally encoded information. The interrogator (transmit antenna) creates an electromagnetic field at the resonant frequency of the RFID tag. When the tag is placed into the field of the interrogator, an AC voltage is induced in the resonant antenna circuit of the tag, which is rectified by the IC to provide the IC with an internal DC voltage. As the tag moves into the field of the interrogator, the induced voltage increases. When the internal DC voltage reaches a level that assures proper operation of the IC, the IC outputs its stored data. To output its data, the IC creates a series of data pulses by switching an extra capacitor across the antenna circuit for the duration of the pulse, which changes the resonant frequency of the tag, detuning the tag from the operational frequency. That is, the tag creates data pulses by detuning itself, which changes the amount of energy consumed by the tag. The interrogator detects the consumption of energy in its field and interprets the changes as data pulses.

Although such RFID tags or cards are known, there are still technical difficulties and limitations associated with the operation of such tags. One problem with attempting to read multiple RFID tags within an interrogation zone of the interrogator is that more than one tag may be activated by the interrogator at about the same time. When such tags are located proximate to each other, the fields generated by one tag can disturb the fields generated by another tag. This problem of mutual inductance is especially significant for RFID tags which transmit their information by detuning, as described above. As a consequence, the effective reading distance drops and the modulation of the tag can become completely ineffective due to the fact that such modulation depends upon the tag being in resonance (or close to it). Thus, such detuning caused by other tags can make the reading of stored information impossible or nearly impossible.

Yet another problem often encountered when reading intelligent tags or cards is a large variation in the received power, for instance, when the tag nears the power transmit antenna of the interrogator. As the tag approaches the transmit antenna, the received power increases, which can cause problems due to excessive voltage or power dissipation and, because of a decrease in tag Q, an inability to sufficiently modulate the tag with the data using the aforementioned detuning approach. Such detuning or modulation problems increase the difficulty of correctly reading the tag.

Accordingly, there is a need for a method of preventing RFID tags from generating fields which disturb or affect other nearby resonant cards or tags. There is further a need for an RFID tag whose operation is not adversely affected by large variations in received power. The present invention fulfills these needs.

BRIEF SUMMARY OF THE INVENTION

Briefly stated, in a first embodiment the present invention is a radio frequency intelligent transponder. The transponder includes an integrated circuit for storing data and an inductor electrically connected to the integrated circuit. The inductor includes a first coil electrically connected to a second coil. A resonant capacitor is electrically connected to the integrated circuit and to at least one of the first and second coils, such that the resonant capacitor and the at least one connected coil have a first predetermined resonant frequency. A switch having a first position and a second position is provided for selectively allowing current to flow through the second coil. When the switch is in the first position, exposure of the transponder to an external field at or near the first resonant frequency induces a voltage in the inductor and causes a first current to flow through the inductor in a first direction, thereby generating a local (near) field. When the switch is in the second position, exposure of the transponder to an external field at or near the first resonant frequency induces a voltage in the inductor and causes a first current to flow through the first coil in a first direction, thereby generating a first local (near) field and a second current to flow through the second coil in a second, opposite direction, thereby generating a second local (near) field. A sum of the first and second local fields approaches zero.

In a second embodiment, the present invention is a radio frequency intelligent transponder comprising an integrated circuit for storing data and an antenna circuit. The antenna circuit comprises a first coil and a resonant capacitor having a predetermined resonant frequency electrically connected to the integrated circuit for providing power to the integrated circuit and for transmitting the data stored in the integrated circuit to a device reader. Exposure of the transponder to an external field at a frequency near the predetermined resonant frequency causes a first current to flow through the antenna circuit in a first direction, thereby producing a first local field which couples the transponder with its environment. The transponder further comprises means for selectively generating a second local field, wherein a sum of the first and second local fields approaches zero, for selectively decoupling the transponder from its environment.

In a third embodiment, the present invention comprises an intelligent resonant tag comprising an integrated circuit for storing data and a first antenna circuit electrically connected to the integrated circuit. Exposure of the first antenna circuit to an electromagnetic field at a first predetermined radio frequency induces a voltage therein, which produces a current flowing in a first direction therethrough, thereby producing a first local field. The induced voltage also provides power to the integrated circuit such that the data stored therein is read therefrom and transmitted at a second predetermined radio frequency. The tag also comprises means for generating a second local field which at least partially cancels the first local field generated by the first antenna circuit.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
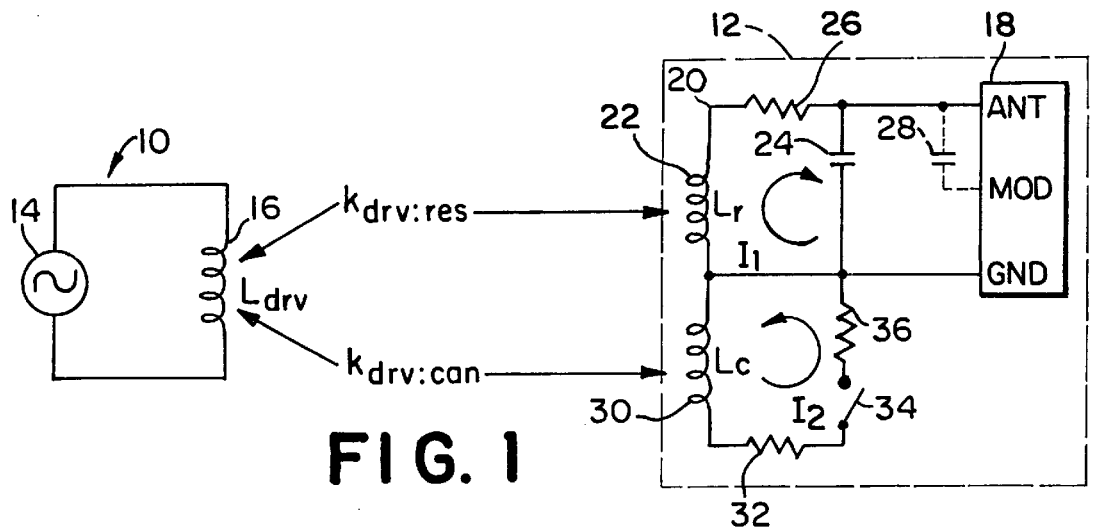
FIG. 1 is an equivalent electrical circuit diagram of an interrogator and a resonant frequency identification (RFID) device in accordance with a first embodiment of the present invention.

Certain terminology is used in the following description for convenience only and is not be taken as a limitation on the present invention. In the drawings, the same reference numerals are employed for designating the same elements throughout the several figures.

The present invention provides a resonant RFID tag in which a net field produced by currents flowing through the tag caused by voltages induced in the tag by an externally applied field selectively approach zero. According to the present invention, an antenna of the tag comprises two coils or inductors and a switch. With the switch in one position, the currents flow through the two inductors in opposite directions such that the field generated by the current flowing through one inductor is essentially canceled by the field generated by the current flowing through the other inductor. With the switch in another position, the configuration of the tag circuit is changed such that no canceling current flows through one of the inductors and thus, no canceling field is generated. In this manner, the tag may be selectively decoupled from its environment. When the tag is decoupled from the environment, the tag does not generate fields which interfere with the operation of any nearby resonant tags.

Referring now to FIG. 1, an equivalent electrical circuit diagram of an interrogator or reader 10 and a resonant frequency identification (RFID) device or transponder 12 in accordance with the present invention is shown. The interrogator 10 includes at least a voltage source 14 electrically connected to a transmitter antenna or coil 16 for generating an electromagnetic field.

The interrogator 10 and the transponder 12 communicate by inductive coupling. Interrogators which communicate with a resonant tag or transponder by inductive coupling are well known in the art. For instance, interrogators are described in U.S. Pat. Nos. 3,752,960, 3,816,708 and 4,580,041, all issued to Walton, all of which are incorporated by reference in their entirety herein. Accordingly, the interrogator 10 is not shown or described in detail. Suffice it to say that the interrogator 10 establishes an electromagnetic field at or near the resonant frequency of the transponder 12. When the transponder 12 is close enough to the interrogator 10 so as to be within the electromagnetic field, a voltage is induced in the transponder 12. As the transponder 12 moves into the field created by the interrogator 10, the induced voltage increases until a voltage level is reached which is sufficient to power the transponder 12 and permit the device to function according to its desired purpose, as described in more detail below. The interrogator 10 may be physically implemented as a pair of smart pedestals (not shown), as a hand-held RFID scanner (not shown) or in some other manner.

The interrogation signal generated by the interrogator 10 is a preferably a generally continuous signal, as opposed to a periodic or pulsed signal. The interrogation zone is the area within the electromagnetic field in which a voltage is induced in the intelligent transponder 12 sufficient to power the transponder 12. Thus, the size of the interrogation zone is defined by the strength of the electromagnetic field. The interrogator 10 can detect transmissions from a plurality of transponders 12 (and thus their associated articles) located within the interrogation zone.

Intelligent devices or transponders are generally known and applicable to a wide variety of uses. U.S. Pat. No. 5,430,441 discloses a transponding tag which transmits a digitally encoded signal in response to an interrogation signal. The above disclosed tag comprises a rigid substrate constructed from a plurality of dielectric layers and conductive layers and includes an integrated circuit embedded entirely within a hole in the substrate and tab bonded to conductive foil traces. The transponder 12 of the present invention comprises an antenna circuit 20 electrically connected to an integrated circuit (IC) 18. Preferably, the antenna circuit 20 comprises a resonant circuit which resonants at a predetermined radio frequency (RF) corresponding to a radio frequency of the interrogator 10, as discussed in more detail hereinafter.

The antenna circuit 20 may comprise one or more inductive elements electrically connected to one or more capacitive elements. In a preferred embodiment, the antenna circuit 20 is formed by the combination of a single inductive element, inductor, or coil 22 electrically connected with a capacitive element or resonant capacitor 24 in a series loop. As is well known to those of ordinary skill in the art, the operational frequency of the antenna circuit 20 depends upon the values of the inductor 22 and the resonant capacitor 24. The size of the inductor 22 and the value of the capacitor 24 are determined based upon the desired resonant frequency of the antenna circuit 20. In one embodiment of the invention, the transponder 12 is constructed to operate at 13.56 MHZ. Although it is preferred that the transponder 12 resonates at about 13.56 MHZ, the transponder 12 could be constructed to resonate at other frequencies and the precise resonant frequency of the transponder 12 is not meant to be a limitation of the present invention. Thus, it will be apparent to those of ordinary skill in the art that the antenna circuit 20 may operate at radio frequencies other than 13.56 MHZ, and indeed at other frequencies, such as microwave frequencies.

A resistor 26 is shown connected in series with the first inductor 22 which represents an equivalent series resistance of the inductor 22 due to power losses. In addition, although the antenna circuit 20 comprises a single inductive element 22 and a single capacitor 24, multiple inductor and capacitor elements could also be employed. For instance, multiple element resonant circuits are known in the electronic security and surveillance art, such as described in U.S. Pat. No. 5,103,210 entitled "Activatable/Deactivatable Security Tag for Use with an Electronic Security System", which is incorporated herein by reference. Although a preferred antenna is described, it will be apparent to those of ordinary skill in the art from this disclosure that any means for coupling energy to/from the IC 18 may be used.

The present invention differs from such known deactivatable devices which include a switch for deactivating the resonant circuit of a resonant tag in that according to the present invention, the antenna circuit 20 is never deactivated. Rather, the circuit 20 still resonates but the field created by the first inductor 22 is effectively neutralized by an offsetting field created by a second inductor, as discussed in detail below.

Preferably, the IC 18, provided for storing data, is a passive device which is powered by the voltage induced in the antenna circuit 20 by the interrogator 10. That is, when the transponder 12 is close enough to the interrogator 10 so as to be within the electromagnetic field, the voltage induced on the inductor 22 provides power to the IC 18 at the ANT input of the IC 18. The IC 18 internally rectifies the induced AC voltage at the ANT input to provide an internal DC voltage source. When the internal DC voltage reaches a level that assures proper operation of the IC 18, the IC 18 functions to output a digital value stored in the programmable memory at the MOD output of the IC 18.

One method of transmitting the data stored in the IC 18 to a reader (not shown) is through the use of a modulation capacitor 28 connected to the MOD output of the IC 18 and to the antenna circuit 20. According to this method, the data output pulses at the MOD output switch the modulation capacitor 28 into and out of the antenna circuit 20 by making and breaking ground connections to change the overall capacitance of the circuit 20 in accordance with the stored data, which in turn changes the resonant frequency of the circuit 20, detuning it from the first predetermined resonant frequency to a predetermined higher frequency. Thus, data pulses of the transponder 12 are created by the tuning and detuning of the resonant antenna circuit 20, such that instead of the antenna circuit 20 returning a simple single frequency response signal, it returns a signal containing a packet of preprogrammed information. Of course, as will be understood by those of ordinary skill in the art, other suitable means of modulation may be used with the present invention. Moreover, although this means of transmitting data to the reader performs adequately, the present invention uses a different means, as discussed in more detail below, to transmit the stored data to the reader.

The packet of information (data pulses) is received and processed by receiving circuitry (not shown) usually associated with the interrogator 10. That is, the receiving circuitry senses the changes in the consumption of energy within the electromagnetic field of the interrogator 10 to determine the digital data value output from the IC 18. If necessary, the data is decoded by the interrogator 10 or circuitry associated therewith to provide identification or other information about an article or person with which the transponder 12 is associated. It is presently preferred to use a passive IC 18 which is powered by the voltage induced in the antenna circuit 20. However, other means for powering the IC 18, such as a battery, are within the scope of the present invention.

The IC 18 may also include a power return or GND output and one or more additional inputs (not shown) which are used for programming the IC 18 (i.e. storing or altering the digital value stored therein) in a conventional manner. In the presently preferred embodiment, the IC 18 comprises 128 bits of nonvolatile memory. Of course, it will be apparent to those of ordinary skill in the art that the IC 18 could have either a greater or smaller storage capacity.

Exposure of the transponder 12 to an external field, such as the field generated by the interrogator 10, at a frequency at or near the first predetermined resonant frequency induces a voltage in the antenna circuit 20, causing a first current $I_1$ to flow through the circuit 20 in a first direction, as indicated by the arrow $I_1$. The flow of the current $I_1$ through the circuit 20 produces a first local electromagnetic field. $K_{drv:res}$ represents the magnetic coupling coefficient between the interrogator coil 16 and the first inductor 22.

As previously discussed, the field generated by the flow of the current $I_1$ through the first inductor 22 can interfere with the operation of other transponders or tags operating proximate to the transponder 12. Accordingly, the present invention further comprises a second, canceling inductor or coil 30. In the embodiment shown in FIG. 1, the second inductor 30 is electrically connected to the first inductor 22. However, as will be apparent to those of ordinary skill in the art from this disclosure, the second inductor 30 need not be electrically connected to the first inductor 22 in order to perform its desired function. A resistor 32 is shown, connected in series to the second inductor 30, which represents an equivalent series resistance of the inductor 30 due to power losses. A switch 34 and a switch resistor 36 connect the second inductor 30 to the antenna circuit 20. The switch resistor 36 represents the equivalent series resistance of the switch 34. The second inductor 30 is connected to the antenna circuit 20 such that when the switch 34 is closed and the transponder 12 is exposed to the external field generated by the interrogator 10 at a frequency at or near the first predetermined frequency, a voltage is induced in each of the first and second inductors 22, 30, causing respective the first current $I_1$ to flow through the circuit 20 in the first direction and a second current $I_2$, to flow through the second inductor 30 in a second direction, opposite to the direction of the first current $I_1$, as indicated by the arrow $I_2$. The flow of the current $I_2$ through the second inductor 30 produces a second local electromagnetic field. $K_{drv:can}$ represents the magnetic coupling coefficient between the interrogator coil 16 and the second (canceling) inductor 30. $K_{res:can}$ represents the magnetic coupling coefficient between the first inductor 20 and the second inductor 30. Typically, $K_{drv:res}$ and $K_{drv:can}$ are less than 0.01 and $K_{res:can}$ is less than 1 and greater than 0.4.

Preferably, the first and second local magnetic fields interact with each other such that a sum of the first and second local magnetic fields approaches zero. That is, a net field produced by the currents that flow in the transponder 12 from the voltages induced in the transponder 12 by the interrogator 10 selectively approach zero. Thus, when the field proximate to the transponder 12 is measured, the measurement approaches that of the field generated by the interrogator 10, as represented by the equation:

$$L_r I_1 + L_c I_2 ==> 0 \tag{1}$$

where $L_r I_1$ is the magnetic flux produced by the first inductor 22 and $L_c I_2$ is the magnetic flux produced by the second inductor 30. $L_r$ is the inductance of the first inductor 22 and $L_c$ is the inductance of the second inductor 30.

The switch 34 is preferably an electronic switch connected to the second inductor 30 to either allow or prevent current from flowing therethrough. The electronic switch 34 may be any suitable device, such as a Field Effect Transistor (FET) and may be either separate from or integral with the IC 18. Optionally, the switch 34 has a memory so that the state of the switch 34 is maintained whether or not power is applied to the transponder 12. One example of such a switch 34 is an FET with a charge storage mechanism associated with its gate electrode, similar to that used in an EEPROM storage cell.

According to the first embodiment, the switch 34 has a first position and a second position for selectively allowing a current to flow through the second coil 30. When the switch 34 is in the first position, the switch 34 is open, and no canceling field will be generated when the transponder 12 is exposed to the external field produced by the interrogator 10. When the switch 34 is in the second position, the switch 34 is closed, thus allowing the second current $I_2$ to flow through the second inductor 30 and create the second local field when the transponder 12 is exposed to the external field produced by the interrogator 10.

Analyzing the transponder 12 circuit, when the switch 34 is closed, the portions of $L_r$ and $L_c$ that are coupled to each other (via $K_{res:can}$) have no voltage induced across them due to the currents $I_1$, $I_2$ that flow through them. The voltages induced in the coupled portions from each current $I_1$, $I_2$ are equal, but opposite in sign so that they add up to zero. Thus, the coupled portions of Lr and $L_c$ can be thought of as being absent for the next stage of analysis.

The first inductor 22 has an induced voltage from the external field generated by the interrogator 10, with the induced voltage being generated across an equivalent series circuit comprising $(1-K_{res:can})L_r$ (the uncoupled portion of the inductance), resistor 26 and the resonant capacitor 24. Since the impedances of $(1-K_{res:can})L_r$ and the resistor 26 are low relative to the impedance of the resonant capacitor 24, the combined impedance of these series elements is predominately capacitive and therefore the current $I_1$ of this series circuit leads the induced voltage by about 90°. Similarly, the second inductor 30 has an induced voltage from the external field generated by the interrogator 10, with the induced voltage being generated across an equivalent series circuit comprising $(1-K_{res:can})L_c$, resistor 32 and the switch resistance 36. Since the series resistance of the resistors 32, 36 is low relative to the impedance of $(1-K_{res:can})L_c$, the combined impedance of these series elements is predominately inductive and therefore the current $I_2$ lags the induced voltage by about 90°. The result is that the currents $I_1$ and $I_2$ have a phase relationship which approaches 180°. That is, the currents $I_1$ and $I_2$ essentially flow in opposite directions. The relative magnitudes of the currents $I_1$ and $I_2$ can be adjusted by controlling the values of the first and second inductors 22, 30 and $K_{res:can}$, by adjusting the number, size and relative placement of the turns of the inductor coils, as will be understood by those of ordinary skill in the art. of course, when the relative magnitudes of the currents $I_1$ and $I_2$ are properly adjusted, the assumption of equation (1) above is true.

As previously discussed, the transponder 12 transmits the data stored in the IC 18 by tuning and detuning the antenna circuit 20. According to the present invention, the switch 34 is connected on one side to the MOD output of the IC 18 and on the other side to GND. The switch 34 is then moved between the open position and the closed position, in accordance with the stored data pattern, to tune and detune the antenna circuit 20, such that the stored data is transmitted to the reader. Thus, the present invention uses the switch 34 and the modified antenna circuit 20 in lieu of the modulation capacitor 28 to tune and detune the antenna circuit 20 and transmit data to a reader.

Figure 2A:
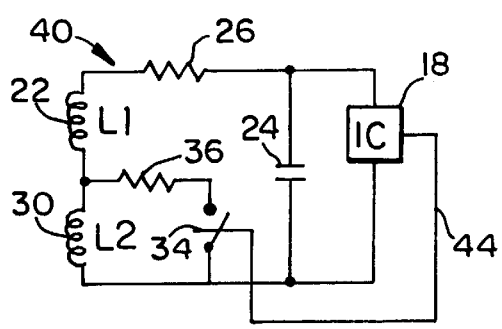
FIG. 2A is an equivalent electrical circuit diagram of an alternate embodiment of an RFID tag in accordance with the present invention.
Figure 2B:
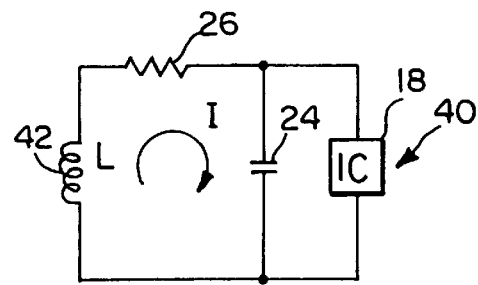
FIG. 2B is a schematic diagram of the equivalent electrical circuit of FIG. 2A in an active state.
Figure 2C:
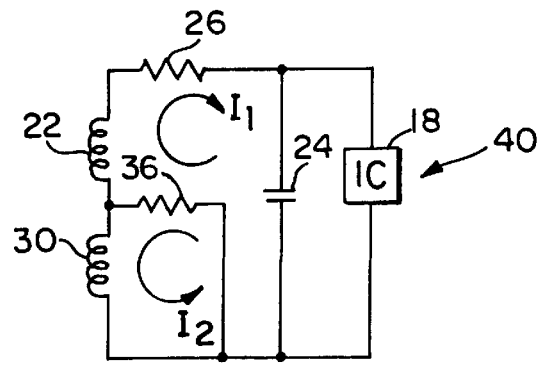
FIG. 2C is a schematic diagram of the equivalent electrical circuit of the RFID tag of FIG. 2A in an inactive state.

Referring now to FIG. 2A, an electrical schematic diagram of a second preferred embodiment of a transponder 40 is shown. Similar to the first embodiment, the transponder 40 includes an IC 18, first and second inductors 22, 30, an equivalent resistance 26, a resonant capacitor 24, a switch 34, and a switch resistance 36. (The equivalent resistance 26 is for both the first and second inductor 22, 30). The transponder 40 operates according to the same basic principles as the circuit 20. That is, the second coil 32 is provided to generate a canceling field, such that a sum of the local fields produced by the currents flowing through the first and second inductors 22, 30 approaches zero. However, according to the second embodiment, a current always flows through the second inductor 30. When the switch 34 is open (FIG. 2B), the transponder 40 comprises a series circuit including the first and second inductors 22, 30, (shown collectively as 42) the resistor 26, and the resonant capacitor 24. While, when the switch 34 is closed (FIG. 2C), a first current $I_1$ flows through the first inductor 22 and a second current $I_2$ flows through the second inductor 30, with the currents $I_1$ and $I_2$ flowing in opposite directions such that the generated local fields are canceling, as previously discussed.

The transponder 40 behaves according to the equations:

$$\omega L1+\omega L2=1/\omega C1 \qquad (2)$$

$$Q=(\omega L1+\omega L2)/R1 \qquad (3)$$

where L1 is the first inductor 22, L2 is the second inductor 30, C1 is the resonant capacitor 24, R1 is the series resistor 26, and ω is the resonant frequency. Note that in FIG. 2B, the inductors 22, 30 are in series and are thus represented by a single inductor 42, where L1=L1+L2.

If the ratio of the turns of the first and second inductors 22, 30 is chosen so that the current $I_2$ flowing through the second inductor 30 produces a magnetic field which is equal in amplitude but of opposite sign as the field produced by the current $I_1$ flowing through the first inductor 22, then the transponder 40 does not unduly influence other transponders proximate to it, since it produces a net field of zero or near zero. This effect can be represented by the equation:

$$I_1=-(N1/N2)^2 k_{L1L2} I_2 \qquad (4)$$

where $k_{L1L2}$ is mutual inductance coupling factor and N1 and N2 are the number of turns of the first and second inductors 22, 30, respectively. The advantage of the second embodiment compared to the first embodiment is that the value of the resonant capacitor can be smaller in the second embodiment (since it is connected across both of the inductors 22, 30).

Preferably the switch 34 is normally open such that the tag is "active". The switch 34 may be controlled by a signal line 44 from the IC 18. The signal line 44 may be controlled by a sequencer within the IC 18. For instance, when the transponder 12 has completed transmitting the data read from the IC 18, then the IC 18 sets the signal line 44, thereby closing the switch 34 so that the transponder 12 is decoupled from its environment. The IC 18 may also include a timer which is used to determined the value of the signal, such that after a predetermined period of time, the switch 34 is opened and, if the transponder 12 is still within the external field generated by the interrogator 10, then the transponder 12 retransmits its data message. Other means of controlling the switch 34 will be apparent to those of ordinary skill in the art.

As previously discussed, the switch 34 is also preferably used to transmit the data stored (and read) from the IC 18 to the reader. That is, the switch 34 is turned on and off to essentially draw energy from the field created by the interrogator 10 and not, respectively, at rates that are equivalent to the rates at which the data would be modulated by other means. This mechanism for modulation results in a signal to the interrogator 10 which is indistinguishable from signals created using other modulation approaches. According to this method, after all of the data has been transmitted, the switch 34 is placed in the closed position so that the transponder 12 is decoupled from its environment.

The switch 34 could also comprise a variable resistance element, such that the resistance of the element can be controlled from nearly zero (the ON resistance of the switch) to essentially infinity (the OFF resistance of the switch) and to any value in between. Such in between values are useful for the purpose of determining how much power to draw from the external field. For example, if the value of the resistance is adjusted to a medium value (one between zero and infinity) a partial decoupling of the transponder 12 occurs, which is useful for the case in which the transponder 12 is immediately adjacent to the interrogator 10 and the external fields generated by the interrogator are especially strong. In a conventional circuit implementation, the power drawn from the external field has to be dissipated in the IC 18. As is known by those of ordinary skill in the art, this power can occasionally be high enough to overheat the IC and destroy it. The advantage of partially decoupling the transponder 12 from its environment is that this reduces the amount of power that can be collected from the external field, and therefore limits the power dissipation requirements of the IC 18. Likewise, the voltages that can be induced in the transponder 12 are minimized, and thus, the possibility of a breakdown due to excessively large induced voltages is reduced.

It will be recognized by those skilled in the art that changes may be made to the above-described embodiment of the invention without departing from the inventive concepts thereof. It is understood, therefore, that this invention is not limited to the particular embodiment disclosed, but is intended to cover any modifications which are within the scope and spirit of the invention as defined by the appended claims.

What is claimed is:

1. A radio frequency intelligent transponder comprising:
   an integrated circuit for storing data;
   an inductor including a first coil electrically connected to a second coil;
   a resonant capacitor electrically connected to the integrated circuit and at least one of the first and second coils, the resonant capacitor and the at least one connected coil having a first predetermined resonant frequency; and
   a switch having a first position and a second position for selectively allowing a current to flow through the second coil, wherein when the switch is in the first position, exposure of the transponder to an external field at or near the first resonant frequency induces a voltage on the inductor and causes a first current to flow through the inductor in a first direction, thereby generating a near field and when the switch is in the second position, exposure of the transponder to an external field at or near the first resonant frequency induces a voltage on the inductor and causes a first current to flow through the first coil in a first direction, thereby generating a first near field and a second current to flow through the second coil in a second, opposite direction, thereby generating a second near field, wherein a sum of the first and second near fields approaches zero.

2. The transponder of claim 1 wherein the voltage induced in the inductor is used to power the integrated circuit.

3. The transponder of claim 1 wherein the first coil and the resonant capacitor resonate at the first resonant frequency when the switch is in the first position.

4. The transponder of claim 1 wherein the first coil, the second coil and the resonant capacitor resonate at the first resonant frequency when the switch is in the first position.

5. The transponder of claim 1 wherein the switch is used as a modulation means to transmit the data stored within the integrated circuit.

6. The transponder of claim 1 wherein the switch comprises an electronic switch.

7. The transponder of claim 6 wherein the switch is located within the integrated circuit.

8. The transponder of claim 6 wherein the switch is normally in the second position.

9. The transponder of claim 1 wherein the switch comprises a variable resistance element such that a magnitude of the second near field is variable, wherein when the second near field is not substantially equal and opposite to the first field, the transponder is not generally decoupled from its environment.

10. The transponder of claim 9 wherein when the switch is in the second position, the transponder is partially decoupled from its environment, thereby reducing the amount of power collected from the external field.

11. A radio frequency intelligent transponder comprising:
    an integrated circuit for storing data;
    an antenna circuit comprising a first coil and a resonant capacitor having a predetermined resonant frequency electrically connected to the integrated circuit for providing power to the integrated circuit and for transmitting the data stored in the integrated circuit to a device reader, wherein exposure of the transponder to an external field at a frequency near the predetermined resonant frequency causes a first current to flow through the first coil in a first direction, thereby producing a first near field which couples the transponder with its environment; and
    means for selectively generating a second near field, wherein a sum of the first and second near fields approaches zero, for selectively decoupling the transponder from its environment.

12. The transponder of claim 11 wherein the means for generating the second near field comprises a second coil.

13. The transponder of claim 12 further comprising a switch electrically connected to the second coil for selectively preventing the second coil from generating the second near field.

14. An intelligent resonant tag comprising:
    an integrated circuit for storing data;
    a first antenna circuit electrically connected to the integrated circuit, wherein exposure of the first antenna circuit to an electromagnetic field at a first predetermined radio frequency induces a voltage therein, which produces a current flowing in a first direction therethrough, thereby producing a first near field, the induced voltage also providing power to the integrated circuit such that the data stored therein is read therefrom and transmitted at a second predetermined radio frequency; and
    means for generating a second near field which at least partially cancels the first near field generated by the first antenna circuit.

15. The intelligent resonant tag of claim 14 further comprising means for varying a magnitude of the second near field, thereby varying a magnitude of the first field.

16. The transponder of claim 15 wherein the magnitude varying means comprises a variable resistance element.

17. The intelligent resonant tag of claim 14 further comprising a switch for selectively generating the second near field, thereby selectively at least partially canceling the first near field.

18. The intelligent resonant tag of claim 14 wherein the first antenna circuit comprises a first inductive coil electrically connected to a resonant capacitor.

19. The intelligent resonant tag of claim 18 wherein the means for generating the second near field comprises a second inductive coil electrically connected to the first inductive coil.

20. The transponder of claim 14 wherein the integrated circuit comprises a non-volatile programmable memory.

* * * * *